(12) United States Patent
Jafarian et al.

(10) Patent No.: US 9,585,091 B2
(45) Date of Patent: Feb. 28, 2017

(54) SYSTEMS AND METHODS FOR LOW POWER WAKE UP SIGNAL AND OPERATIONS FOR WLAN

(71) Applicant: Qualcomm Incorporated, San Diego, CA (US)

(72) Inventors: Amin Jafarian, San Diego, CA (US); Simone Merlin, San Diego, CA (US); Stephen Jay Shellhammer, Ramona, CA (US); Vincent Knowles Jones, IV, Redwood City, CA (US); Alfred Asterjadhi, Chicago, IL (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 13/831,131

(22) Filed: Mar. 14, 2013

(65) Prior Publication Data
US 2014/0050133 A1    Feb. 20, 2014

Related U.S. Application Data

(60) Provisional application No. 61/684,532, filed on Aug. 17, 2012.

(51) Int. Cl.
*H04W 52/02*   (2009.01)
*H04W 74/08*   (2009.01)
*H04W 74/00*   (2009.01)

(52) U.S. Cl.
CPC ......... *H04W 52/02* (2013.01); *H04W 52/028* (2013.01); *H04W 52/0235* (2013.01);
(Continued)

(58) Field of Classification Search
CPC ........... H04W 52/028; H04W 52/0274; H04W 52/0277; H04W 74/0816; H04W 74/0808; H04W 74/0825; Y02B 60/50
See application file for complete search history.

(56) References Cited

U.S. PATENT DOCUMENTS

| 6,590,886 B1 | 7/2003 | Easton et al. |
| 7,295,827 B2 | 11/2007 | Liu et al. |
| (Continued) | | |

FOREIGN PATENT DOCUMENTS

EP    2160061 A2    3/2010

OTHER PUBLICATIONS

IEEE Std 802.11, 1999 Edition, Part 11: Wireless LAN Medium Access Control (MAC) and Physical Layer (PHY) Specifications, 1999, 528 pages.*

(Continued)

*Primary Examiner* — Hoon J Chung
(74) *Attorney, Agent, or Firm* — Kevin T. Cheatham

(57) ABSTRACT

Systems, methods, and devices for wireless communication. In one aspect an apparatus for wirelessly communicating with a wireless station is provided. The apparatus comprises a first transceiver configured to receive a backoff signal from the wireless station during a first time period, the backoff signal configured to indicate a second time period. The apparatus further comprises a processor operationally coupled to the first transceiver and configured to refrain the first transceiver from transmitting a wireless signal during the second time period.

70 Claims, 10 Drawing Sheets

(52) U.S. Cl.
CPC ....... *H04W 52/0293* (2013.01); *H04W 74/00* (2013.01); *H04W 74/085* (2013.01); *H04W 74/0816* (2013.01); *Y02B 60/50* (2013.01)

(56) References Cited

U.S. PATENT DOCUMENTS

| | | | |
|---|---|---|---|
| 7,904,023 B2 | 3/2011 | Viitamaki et al. | |
| 8,055,313 B2 | 11/2011 | Behzad et al. | |
| 8,150,477 B2 | 4/2012 | Cho et al. | |
| 8,175,109 B2 | 5/2012 | Nogueira-Nine et al. | |
| 8,179,873 B2 | 5/2012 | Bonta et al. | |
| 8,203,985 B2 | 6/2012 | Gong et al. | |
| 8,223,680 B2 | 7/2012 | Twitchell, Jr. | |
| 8,249,644 B2 | 8/2012 | Taniuchi et al. | |
| 2001/0041551 A1 | 11/2001 | Rotzoll | |
| 2003/0128684 A1 | 7/2003 | Hirsch et al. | |
| 2004/0110508 A1 | 6/2004 | Haartsen | |
| 2005/0122231 A1* | 6/2005 | Varaiya et al. | 340/870.01 |
| 2005/0130713 A1 | 6/2005 | Simpson et al. | |
| 2006/0128349 A1 | 6/2006 | Yoon et al. | |
| 2006/0229053 A1 | 10/2006 | Sivard | |
| 2007/0140157 A1 | 6/2007 | Fu et al. | |
| 2007/0207765 A1 | 9/2007 | Nakahara et al. | |
| 2007/0242634 A1 | 10/2007 | Calcev et al. | |
| 2008/0014969 A1 | 1/2008 | Laroia et al. | |
| 2008/0108318 A1 | 5/2008 | Min et al. | |
| 2008/0130603 A1 | 6/2008 | Wentink et al. | |
| 2009/0129306 A1 | 5/2009 | Twitchell, Jr. et al. | |
| 2009/0147837 A1 | 6/2009 | Lau | |
| 2010/0054214 A1 | 3/2010 | Igarashi et al. | |
| 2010/0097969 A1 | 4/2010 | De Kimpe et al. | |
| 2010/0099358 A1 | 4/2010 | Kumar et al. | |
| 2010/0135263 A1* | 6/2010 | Zakrzewski | G01D 21/00 370/338 |
| 2010/0322126 A1* | 12/2010 | Krishnaswamy et al. | 370/311 |
| 2011/0140851 A1 | 6/2011 | Lee et al. | |
| 2011/0141969 A1 | 6/2011 | Sridhara et al. | |
| 2011/0194471 A1 | 8/2011 | Kim et al. | |
| 2011/0289320 A1 | 11/2011 | Twitchell, Jr. et al. | |
| 2011/0296058 A1 | 12/2011 | Cho et al. | |
| 2011/0298435 A1 | 12/2011 | Homol et al. | |
| 2012/0120859 A1 | 5/2012 | Stephens et al. | |
| 2012/0171954 A1 | 7/2012 | Rudland et al. | |
| 2012/0230337 A1 | 9/2012 | Lee et al. | |
| 2013/0077610 A1 | 3/2013 | Amini et al. | |
| 2013/0114583 A1 | 5/2013 | Park et al. | |
| 2013/0238919 A1 | 9/2013 | Ponmudi et al. | |
| 2013/0301441 A1 | 11/2013 | Russell et al. | |
| 2013/0301569 A1 | 11/2013 | Wang et al. | |
| 2014/0112224 A1 | 4/2014 | Jafarian | |
| 2014/0126442 A1 | 5/2014 | Jafarian et al. | |
| 2015/0036576 A1 | 2/2015 | Jafarian | |

OTHER PUBLICATIONS

IEEE Std 802.Nov. 2007, Part 11: Wireless LAN Medium Access Control (MAC) and Physical Layer (PHY) Specifications, 2007, 1076 pages.*

International Search Report and Written Opinion—PCT/US2013/053481—ISA/EPO—Nov. 5, 2013.

Ansari J., et al., "Radio-Triggered Wake-ups with Addressing Capabilities for Extremely Low Power Sensor Network Applications," IEEE 19th International Symposium on Personal, Indoor and Mobile Radio Communications, PIMRC 2008, pp. 1-5.

* cited by examiner

1200A

1200B

1200C

SYSTEMS AND METHODS FOR LOW POWER WAKE UP SIGNAL AND OPERATIONS FOR WLAN

CROSS REFERENCE TO RELATED APPLICATIONS

This application claims priority under 35 U.S.C. §119(e) to U.S. Provisional Patent Application No. 61/684,532 entitled "SYSTEMS AND METHODS FOR LOW POWER WAKE UP SIGNAL AND OPERATIONS FOR WLAN" filed on Aug. 17, 2012, the disclosure of which is hereby incorporated by reference in its entirety.

BACKGROUND

Field

The present application relates generally to wireless communications, and more specifically to systems, methods, and devices to enable wireless communication. Certain aspects herein relate to low power wake up signals and operations for WLAN.

Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include providing wireless communication in sub-gigahertz bands for low power and long distance wireless communications.

One aspect of the disclosure provides an apparatus for wireless communications. The apparatus includes a first receiver configured to wirelessly receive data packets and consume power at a first power level during operation. The apparatus further includes a second receiver operationally coupled to the first receiver and configured to detect a wake-up signal received from a transmitter station. The second receiver is further configured to consume power at a second power level during operation that is less than the first power level. The apparatus further includes a processor operationally coupled to the first receiver and the second receiver and configured to wake up the first receiver when the second receiver successfully detects the wake-up signal.

Another aspect of the disclosure provides an implementation of a method of wireless communication. The method includes wirelessly receiving, at a first receiver, wireless data packets. The first receiver is configured to consume power at a first power level during operation. The method further includes detecting, at a second receiver, a wake-up signal transmitted by a transmitter station. The second receiver is configured to consume power at a second power level during operation that is less than the first power level. The method further includes wirelessly waking the first receiver when the second receiver successfully detects the wake-up signal.

Yet another aspect of the disclosure provides an apparatus for wireless communications. The apparatus includes means for receiving wireless data packets. The means for receiving the data packet is configured to consume at a first power level during operation. The apparatus further includes means for detecting a wake-up signal transmitted by a transmitter station. The means for detecting the wake-up signal is configured to consume power at a second power level during operation that is less than the first power level. The apparatus further includes means for means for waking the first receiver when the second receiver detects the wake-up signal.

Another aspect of the disclosure provides an apparatus for wireless communications with a wireless station. The apparatus includes a first transceiver configured to receive a backoff signal from the wireless station during a first time period. The backoff signal is configured to indicate a second time period. The apparatus further includes a processor operationally coupled to the first transceiver and configured to refrain the first transceiver from transmitting a wireless signal during the second time period.

Another aspect of the disclosure provides an implementation of a method for wirelessly communicating with a wireless station. The method includes receiving a backoff signal from the wireless station during a first time period. The backoff signal is configured to indicate a second time period. The method further includes refraining from transmitting a wireless signal during the second time period.

Another aspect of the disclosure provides an apparatus for wireless communications with a wireless station. The apparatus includes means for receiving a backoff signal from the wireless station during a first time period. The backoff signal is configured to indicate a second time period. The apparatus further includes means for refraining from transmitting a wireless signal during the second time period.

Another aspect of the disclosure provides an apparatus for wireless communications with a wireless first transceiver and a second wireless receiver via a wireless medium. The apparatus includes a processor configured to generate a backoff signal configured to indicate a time period for the first transceiver to defer an access to the wireless medium during the time period. The apparatus further includes a transmitter operationally coupled to the processor and configured to transmit the backoff signal to the first transceiver and the second receiver. The backoff signal is further configured to wake up the second receiver.

Another aspect of the disclosure provides an implementation of a method for wirelessly communicating with a wireless first transceiver and a second wireless receiver via a wireless medium. The method includes generating a backoff signal configured to indicate a time period to the first transceiver such that the first transceiver defers an access to the wireless medium during the time period. The method further includes transmitting the backoff signal to the first transceiver and the second receiver. The backup signal is configured to wake up the second receiver.

Another aspect of the disclosure provides an apparatus for wireless communications. The apparatus includes means for generating a backoff signal configured to indicate a time period to the first transceiver such that the first transceiver defers an access to the wireless medium during the time period. The apparatus further includes means for transmitting the backoff signal to the first transceiver and the second receiver. The backup signal is configured to wake up the second receiver.

DETAILED DESCRIPTION

Figure 1:
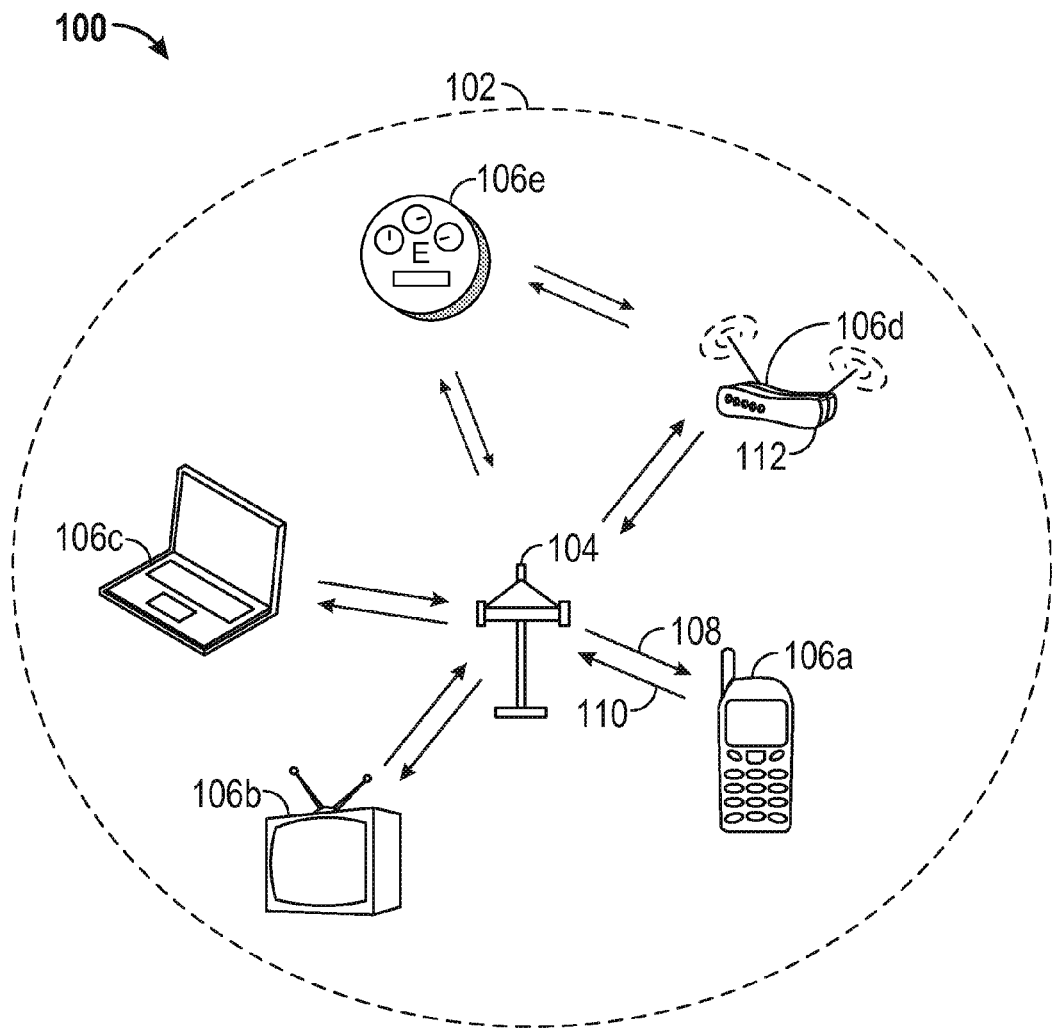
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols. For example, the various aspects described herein may interoperate with or be used as part of the IEEE 802.11ah protocol, which may use sub-1 GHz bands. However, it should be appreciated that a wide variety of other bands and wireless protocols are contemplated by the embodiments described herein.

In some aspects, wireless signals in a sub-gigahertz band may be transmitted according to the 802.11 protocol using orthogonal frequency-division multiplexing (OFDM), direct-sequence spread spectrum (DSSS) communications, a combination of OFDM and DSSS communications, or other schemes. Implementations described herein may be used for sensors, metering, and smart grid networks. Advantageously, aspects of certain embodiments may include wireless devices that may consume less power than devices implementing other wireless protocols, and/or may be used to transmit wireless signals across a relatively long range, for example about one kilometer or longer. These devices may be configured to operate on power provided by energy storage devices and may be configured to operate without replacing the energy storage device for long periods of time (e.g., months or years).

Certain of the devices described herein may further implement Multiple Input Multiple Output (MIMO) technology. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min \{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Devices described herein, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example an 802.11 standard. The wireless communication system 100 may include an AP 104, which communicates with STAs 106a, 106b, 106c, 106d, and 106e (collectively STAs 106).

STA 106e may have difficulty communicating with the AP 104 or may be out of range and unable to communicate with the AP 104. As such, another STA 106d may be configured as a relay 112 that relays communications between the STA 106e and the AP 104.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
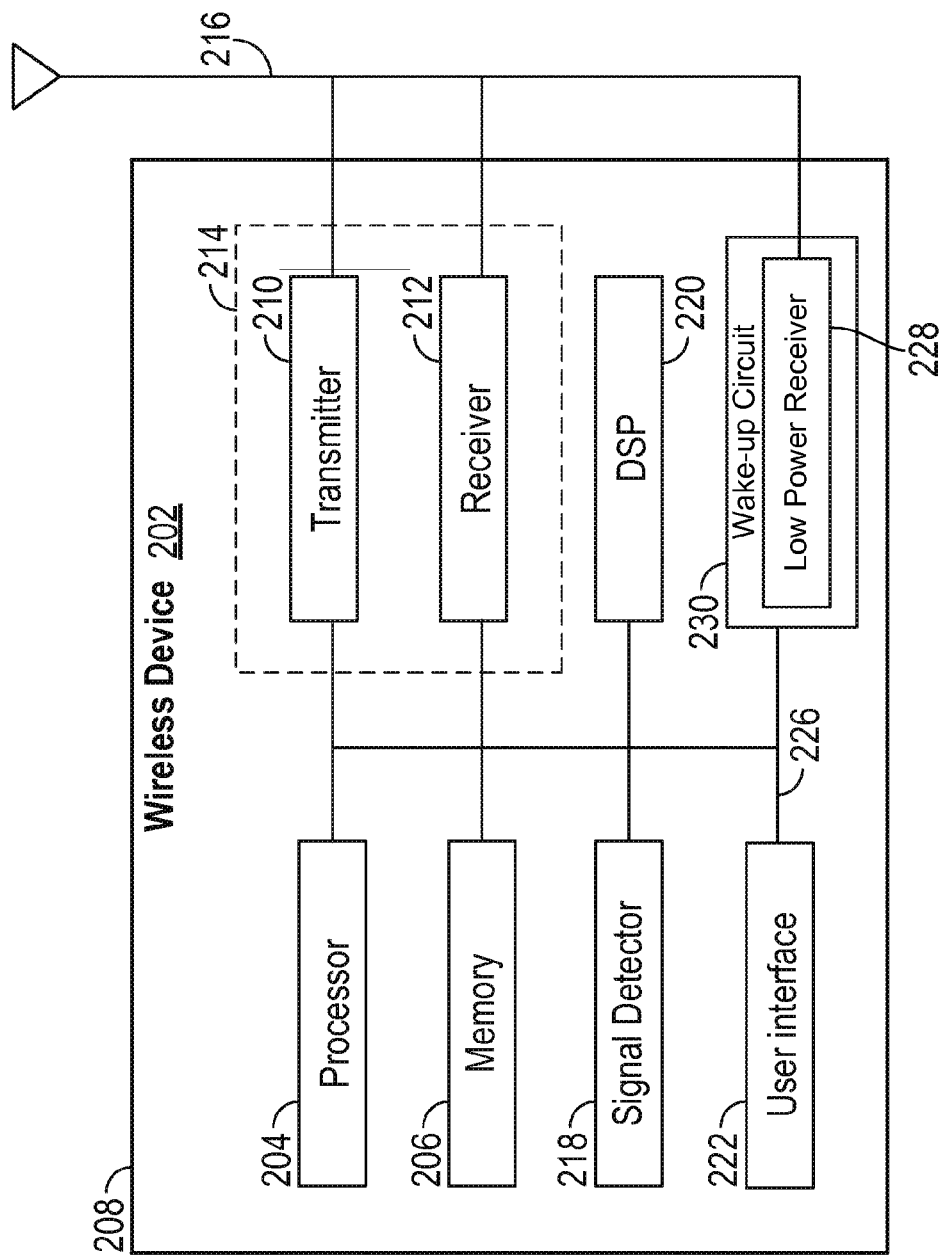
FIG. 2 shows a functional block diagram of an exemplary wireless device that may be employed within the wireless communication system of FIG. 1, in accordance with an exemplary embodiment of the invention.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104, or one of the STAs 106 of FIG. 1.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to select one of a plurality of media access control (MAC) header types, and to generate a packet having that MAC header type. For example, the processor 204 may be configured to generate a packet comprising a MAC header and a payload and to determine what type of MAC header to use, as discussed in further detail below.

When the wireless device 202 is implemented or used as a receiving node, the processor 204 may be configured to process packets of a plurality of different MAC header types. For example, the processor 204 may be configured to determine the type of MAC header used in a packet and process the packet and/or fields of the MAC header accordingly as further discussed below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different MAC header types. For example, the transmitter 210 may be configured to transmit packets with different types of headers generated by the processor 204, discussed above.

The receiver 212 may be configured to wirelessly receive packets having different MAC header type. In some aspects, the receiver 212 is configured to detect a type of a MAC header used and process the packet accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a wake-up circuit 230 comprising a second, low power receiver 228. In one aspect, the low power receiver 228 may be configured to consume power that is lower than power normally consumed by the receiver 214 during operation. For example, the low power receiver 228 may be configured to consume on the order of 10×, 20×, 50× or 100× (or more) less power when operating as compared to the transceiver 214.

In one aspect, the low power receiver 228 may be configured to receive signals using modulation/demodulation techniques other than OFDM techniques. For example, the low power receiver 228 may be configured to receive signals using modulation/demodulation techniques such as on-off keying or frequency-shift keying (FSK) as compared to the transceiver 214 that may be configured to transmit and receive signals based on OFDM and other comparable techniques. By receiving signals using techniques other than OFDM, the receiver design may be simplified so that less power is consumed compared to a receiver configured to receive signals modulated using OFDM.

In another aspect, the low power receiver 228 may be configured to receive signals using OFDM modulation, and the MAC layer of the low power receiver 228 may be shut down so that only a particular signal may be received that does not require use of the MAC layer. For example, the receiver may be configured to decode only a specific signal with a particular structure, such as a particular length and with particular frames. In some embodiments, the specific signal may include a wake-up signal. All other signals that do not include the specific packet will not be decoded. Accordingly, the receiver 228 may consume less power than receivers that are configured to decode each signal that is received.

In some aspects, only an optimized portion of the low power receiver 228 may be turned on to decode a particular signal. For example, if only a single receiver is included in the particular STA, only a portion of that receiver may be used to receive a wake-up signal. Less power is consumed by the low power receiver 228 when only a portion of the receiver 228 is used in decoding the signal.

A STA 106 that is a wireless device 202 having the low power receiver 228 may be referred to herein as a low power receiver STA 106e. Other STAs that may not include the low power receiver 228 or may be operating in a mode where the transceiver 214 is activated may be referred to herein as a STA 106.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore, the processor 204 may be used to implement any of the components, modules, circuits, or the like described below, or each may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

Figure 3:
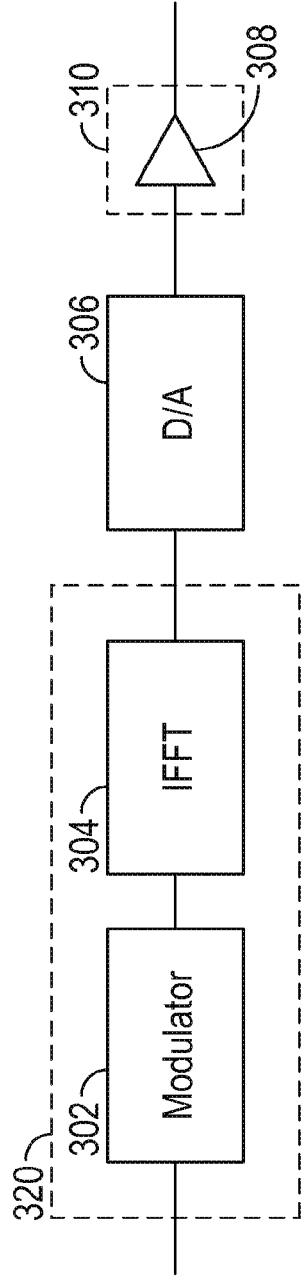
FIG. 3 shows a functional block diagram of exemplary components that may be utilized in the wireless device of FIG. 2 to transmit wireless communications, in accordance with an exemplary embodiment of the invention.

As discussed above, the wireless device 202 may comprise an AP 104, a STA 106, or a low power receiver STA 106e. FIG. 3 illustrates various components that may be utilized in the wireless device 202t to transmit wireless communications. The components illustrated in FIG. 3 may be used, for example, to transmit OFDM communications.

The wireless device 202t of FIG. 3 may comprise a modulator 302 configured to modulate bits for transmission. For example, the modulator 302 may determine a plurality of symbols from bits received from the processor 204 (FIG. 2) or the user interface 222 (FIG. 2), for example by mapping bits to a plurality of symbols according to a constellation. The bits may correspond to user data or to control information. In some aspects, the bits are received in codewords. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202t may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 304 may be referred to as the size of the transform module 304. It should be appreciated that the transform module 304 may be configured to operate according to additional modes where 128 points, 256 points, 512 points, and 1024 points are used, and the like.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 202t (e.g., see description above with reference to FIG. 2).

As discussed above, the DSP 320 may be configured to generate a data unit for transmission. In some aspects, the modulator 302 and the transform module 304 may be configured to generate a data unit comprising a plurality of fields including control information and a plurality of data symbols.

Returning to the description of FIG. 3, the wireless device 202b may further comprise a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202 of FIG. 2. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the amplifier 308 comprises a low noise amplifier (LNA).

The transmitter 310 is configured to transmit one or more packets or data units in a wireless signal based on the analog signal. The data units may be generated using the processor 204 (FIG. 2) and/or the DSP 320, for example using the modulator 302 and the transform module 304 as discussed above. Data units that may be generated and transmitted as discussed above are described in additional detail below.

Figure 4:
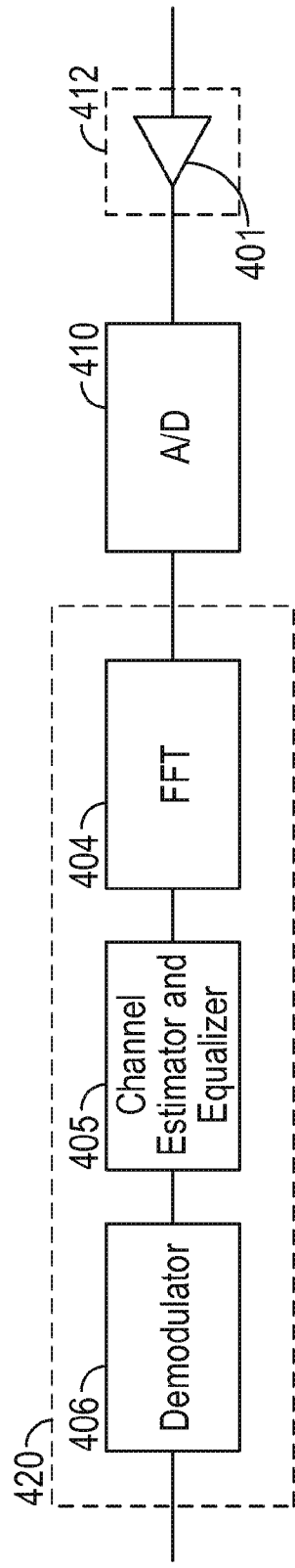
FIG. 4 shows a functional block diagram of exemplary components that may be utilized in the wireless device of FIG. 2 to receive wireless communications, in accordance with an exemplary embodiment of the invention.

FIG. 4 illustrates various components that may be utilized in the wireless device 202 of FIG. 2 to receive wireless communications. The components illustrated in FIG. 4 may be used, for example, to receive OFDM communications. In some aspects, the components illustrated in FIG. 4 are used to receive data units over a bandwidth of equal to or less than 1 MHz. For example, the components illustrated in FIG. 4 may be used to receive data units transmitted by the components discussed above with respect to FIG. 3.

The receiver 412 of wireless device 202b is configured to receive one or more packets or data units in a wireless signal. Data units that may be received and decoded or otherwise processed as discussed below.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 202r may comprise an analog to digital converter 410 configured to convert the amplified wireless signal from the receiver 412 into a digital representation thereof. Further to being amplified, the wireless signal may be processed before being converted by the digital to analog converter 410, for example by being filtered or by being downconverted to an intermediate or baseband frequency. The analog to digital converter 410 may be implemented in the processor 204 (FIG. 2) or in another element of the wireless device 202r. In some aspects, the analog to digital converter 410 is implemented in the transceiver 214 (FIG. 2) or in a data receive processor.

The wireless device 202r may further comprise a transform module 404 configured to convert the representation of the wireless signal into a frequency spectrum. In FIG. 4, the transform module 404 is illustrated as being implemented by a fast Fourier transform (FFT) module. In some aspects, the transform module may identify a symbol for each point that it uses. As described above with reference to FIG. 3, the transform module 404 may be configured with a plurality of modes, and may use a different number of points to convert the signal in each mode. For example, the transform module 404 may have a mode where 32 points are used to convert a signal received over 32 tones into a frequency spectrum, and a mode where 64 points are used to convert a signal received over 64 tones into a frequency spectrum. The number of points used by the transform module 404 may be referred to as the size of the transform module 404. In some aspects, the transform module 404 may identify a symbol for each point that it uses. It should be appreciated that the transform module 404 may be configured to operate according to additional modes where 128 points, 256 points, 512 points, and 1024 points are used, and the like.

The wireless device 202b may further comprise a channel estimator and equalizer 405 configured to form an estimate of the channel over which the data unit is received, and to remove certain effects of the channel based on the channel estimate. For example, the channel estimator 405 may be configured to approximate a function of the channel, and the channel equalizer may be configured to apply an inverse of that function to the data in the frequency spectrum.

The wireless device 202t may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204 (FIG. 2), or used to display or otherwise output information to the user interface 222 (FIG. 2). In this way, data and/or information may be decoded. In some aspects, the bits correspond to codewords. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 420. In some aspects, however, one or more of the transform module 404, the channel estimator and equalizer 405, and the demodulator 406 are implemented in the processor 204 (FIG. 2) or in another element of the wireless device 202 (FIG. 2).

As discussed above, the wireless signal received at the receiver 212 comprises one or more data units. Using the functions or components described above, the data units or data symbols therein may be decoded evaluated or otherwise evaluated or processed. For example, the processor 204 (FIG. 2) and/or the DSP 420 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The wireless device 202a shown in FIG. 3 shows an example of a single transmit chain to be transmitted over an antenna. The wireless device 202b shown in FIG. 4 shows an example of a single receive chain to be received over an antenna. In some implementations, the wireless device 202a or 202b may implement a portion of a MIMO system using multiple antennas to simultaneously transmit data.

Accordingly, certain implementations are directed to sending wireless signals using a variety of different bandwidths in different frequency ranges. For example, in one exemplary implementation, a symbol may be configured to be transmitted or received using a bandwidth of 1 MHz. The wireless device 202 of FIG. 2 may be configured to operate in one of several modes. In one mode, symbols such as OFDM symbols may be transmitted or received using a bandwidth of 1 MHz. In another mode, symbols may be transmitted or received using a bandwidth of 2 MHz. Additional modes may also be provided for transmitting or receiving symbols using a bandwidth of 4 MHz, 8 MHz, 16 MHz, and the like. The bandwidth may also be referred to as the channel width. In addition, additional modes or configuration are possible such as for example of using bandwidths of 20 MHz, 40 MHz, 80 MHz, and the like in the 2.4 GHz band or the 5 GHz. Band.

In a STA 106, a significant source of power consumption may be due to the long time spent by the STA 106 in receive mode, either during packet reception and especially during the time a receiver is on and waiting to receive a packet. In battery operated STAs, transmit power may be comparable to receive power, but receive time may be much longer than transmit time. Particularly when operating using a battery, it is desirable to reduce the awake time of STAs to reduce power consumption. An awake time, an awake period, an awake mode or an active mode is an operation of a STA such that the STA is actively receiving and/or transmitting a wireless signal. One way to reduce the awake time of a STA 106 is to turn off the STA receiver 212 for a majority of a time interval except for certain short intervals of time. In this case the transmitter 210 and receiver 212 may agree on the on/off cycle. In some cases, this may not be flexible or efficient. For example, in typical applications, the traffic pattern may not be predictable. In addition, the agreed awake time may not match the traffic pattern so some awake times may be useless. In addition, the traffic may come at times where STA 106 is off and there may be no way to deliver the packet until the STA 106 wakes up.

In an embodiment, a low power receiver 228 as described above may be provided in a low power receiver STA 106e. In one aspect, the low power receiver STA 106e may communicate with an AP 104. In this case, there may be an association (e.g., registration) procedure where certain information is exchanged between the low power receiver STA 106e and the AP 104 to determine future communication parameters and activities. In another aspect, the low power receiver STA 106e may communicate between other STAs that are not associated with each other.

In one aspect, the low power receiver 228 may remain on substantially indefinitely while the low power receiver STA 106e is in operation. In another aspect, the low power "wake up" receiver 228 may be operate according to an on/off duty cycle as defined by a given schedule, to further reduce energy consumption. For example, the processor 204 or a controller (not shown) may regulate the schedule. Furthermore, the processor 204 may be configured to otherwise control when the low power receiver 228 listens for the wake-up signal for different durations and time periods (e.g., awake periods for example during business hours as compared to other sleep periods. A sleep period or a sleep mode is an operation of a wireless device, in which the wireless device is not actively receiving or transmitting a wireless signal for consuming much less power or even zero power.).

According to an embodiment, to maximize sleep, the transceiver 214, analog and digital, may be configured to be off (e.g., powered down). The only circuit that is powered is the RF wake-up circuit 230. The low power receiver 228 of the RF wake-up circuit 230 may listen for a particular RF signal structure. When detected, the RF wake-up circuit 230 turns on or otherwise activates the transceiver 214, analog and digital. In some cases, the transceiver 214 and modem may take ~100-200 us to wake-up (assuming transceiver 214 stays powered). The wake up time may be a function of phase-locked loop (PLL) convergence time, loading of calibration coefficients, and other register loading. In some cases, wake-up time may be as large as ~2 ms if transceiver 214 is fully powered off as well. Thus, in one aspect, the wake-up packet may include a backoff signal for reserving a wireless medium for a time period for the transceiver 214 to wake-up and start receiving data and include the special RF signal structure.

In some embodiments, a low power receiver STA 106e may not be associated with other STAs. For examples the STA 106e and other STAs may not be associated with an AP and their interaction with each other is based on events and temporary proximity (e.g., asynchronous operation). For example, in a building, a battery operated small sensor is placed in each room. Each sensor may be configured as a low power receiver STA 106e. As described above, the transceiver 214 of the STA 106e is normally off, to save power. A smartphone, configured as a STA 106, comes in to the building and wants to interact with the sensor STA 106e, e.g., to discover its location or issue a command. The smartphone STA 106 issues a low power wake up signal. A neighboring sensor STAs 106e may be configured to detect the low power wake-up signal using the wake-up circuit 230 and activate or turn on the transceiver 214 (radio). Either the sensor STA 106e proactively sends a packet indicating the location, or the sensor STA 106e waits for reception of a packet from the smartphone STA 106 to determine which action to take.

The wake-up circuit 230 may be configured to operate according to several modes. For example, in a first mode the low power receiver 228 is always on and waiting to receive a wake up packet. This may ensure fastest response but results in higher power consumption. In another mode, the low power wake-up receiver 228 is not always on and may operate according to a wake-up duty cycle. The wake up duty cycle may be adapted to tolerable interaction delay. In some cases, the wake up signal may therefore be sent multiple times to find the receiver in the ON state.

In other embodiments a low power receiver STA 106e may be associated with an AP 104. As such, in one aspect, the low power receiver STA 106e interaction is with the AP 104 and can exploit cooperation with the AP 104 (e.g., synchronous operation is possible). For example, when associated there may be ways to enhance existing power save modes. For example, in a power save mode, a low power receiver STA 106e may wake up to receive beacons. The beacon indicates if the low power receiver STA 106e needs to stay awake further to receive downlink data (e.g., paged). In addition, there may be enhancement with low power wake-up receiver 228 where the AP 104 sends a low power wake-up signal before the beacon, indicating whether the low power receiver STA 106e is (or may) be paged in the beacon. If the low power receiver STA 106e is for sure not paged, the low power receiver STA 160e need not turn on the transceiver 214 to receive the beacon to save power. In these cases, the low power receiver 228 may need to be on at least some time before the beacon, to receive the wake-up signal.

In addition, by using association there may be benefits based on traffic assumption. For example as there may be a low probability of downlink data (in this case the low power receiver STA 106e may go to sleep most of the times after the low power wake-up signal. In addition, there may be benefits in the case of long sleep time and large clock drift where the low power wake-up signal indicates when a beacon is coming. The low power receiver STA 1063 need not turn on the transceiver 214 until that time.

The RF low power wake-up signal may be transmitted on the same channel as other data signals. For example, the low power wake-up signal may be transmitted on the same channel as Wi-Fi data signals. As such, coexistence with the other data is provided. More particularly, coexistence with Wi-Fi signals may be provided. In one aspect, various considerations may be taken into account for providing coexistence. For example, a wake-up signal may have narrower bandwidth than a Wi-Fi signal. In addition, there may be regulatory limitations on how narrowband the wake-up signal can be which may imply a limit on the sensitivity/range. The low power receiver STAs 106e may be power constrained and likely using low transmit power themselves. As such, for STAs 106e in an associated state (e.g., likely to be close to the AP 104), the downlink link budget may be several dB better than the uplink one. Furthermore, it may be acceptable that the sensitivity of low wake up receiver 228 is up to ~20 dB worse than the regular receiver. For non-associated STAs, for proximity application (e.g. location tags, non-associated scenario) the applications may require less sensitivity, because the range may be less important.

Figure 5A:
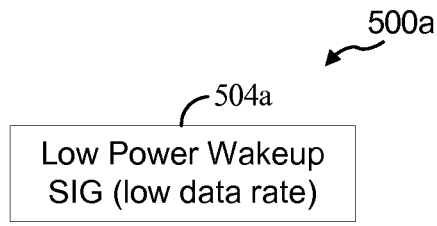
FIG. 5A shows an exemplary low power wake up signal, in accordance with an exemplary embodiment of the invention.

FIG. 5A shows a structure of an exemplary low power wake-up signal 500a, in accordance with an embodiment of the invention. For example, the wake-up signal 500a may be a single-phase signal 504a that carries an encoded signal. The wake-up signal may be transmitted using on-off keying, frequency-shift keying, or the like. For example, if using something similar to on-off keying, the wake-up signal 500a may be a sequence represented as zeros and ones. When the wake-up circuit 330 and low power receiver 228 detect a particular sequence of zeros and ones, the wake-up circuit 330 may trigger turning on the transceiver 214. The wake-up circuit 330 may have multiple correlators to try to detect each possible signal.

Figure 5B:
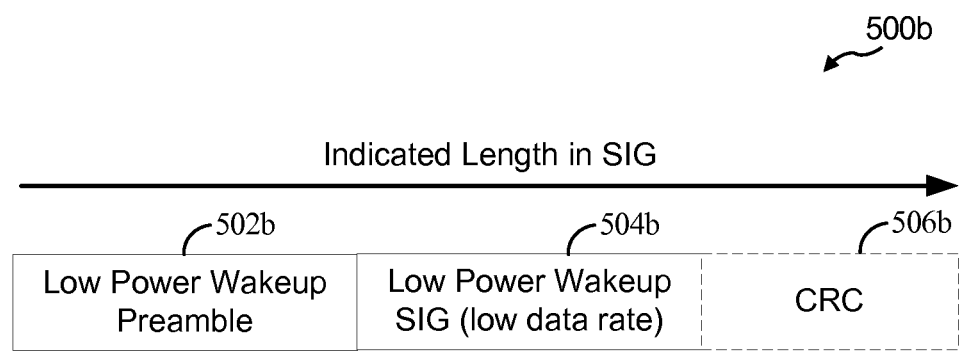
FIG. 5B shows another exemplary low power wake up signal, in accordance with an exemplary embodiment of the invention.

FIG. 5B shows a structure of another exemplary low power wake-up signal 500b, in accordance with an embodiment of the invention. The low power wake-up signal includes two portions. The first portion 502b includes a 'global' sequence (robust), i.e. like a 'low power wake up preamble.' This may allow the low power receiver 228 to detect that a low power signal 500b is coming up. The second portion 504b, following the first portion 502a, includes encoded information. The encoded information may indicate the identifier of the STA 106e to be woken up or other information. Optionally, there may be a third portion 506b including a checksum for error detection. The first portion 502b may be formed using an on-off keying, frequency-shift keying, or other modulated preamble sequence that may provide the timing and detection. In some embodiments, the second portion 504b may include data that may be spread/encoded. Spreading/encoding may be agreed by transmitting and receiving STAs.

In addition, the low power wake-up signal may be provided in a sequence of transmissions that provide for coexistence. For example, an additional 'Wake-up PPDU format' preamble may be provided, such as an new wake-up PPDU format for a 802.11 OFDM PHY preamble followed by the new low power wake-up signal. The OFDM PHY preamble may indicate a duration (in SIG field) that makes 802.11 STAs defer for the duration of the signal and the wake-up time for the receiver. The 802.11 STAs may assume there is a regular packet coming up. As such, reception of the payload may fail, but the 802.11 STA defers for the time indicated in PHY preamble. Furthermore, the low power wake-up signal may be provided to have up to ~20 ms signaling duration to match the duration of a typical PPDU. In addition, Null Packets (QoS Null frames to the STA) may be sent during the wake-up time (e.g., period of time the transceiver 214 of the low power receiver STA 106e needs to be turned on) to make sure other devices honor contention based mechanisms for accessing the channel. In addition, there may be multiple wake-up signals protected by a same PHY preamble. In addition, the PHY preamble may have a bandwidth that narrower than an 802.11 preamble.

Figure 6A:
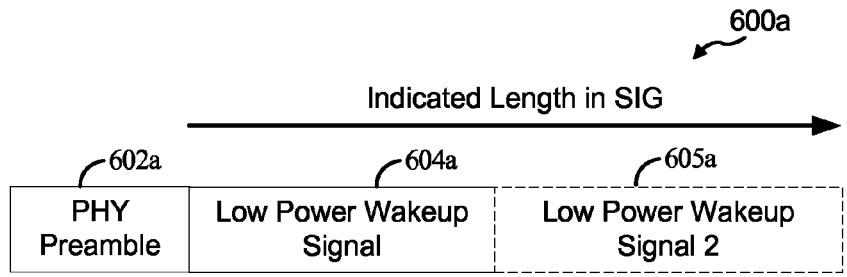
FIGS. 6A, 6B, 6C, and 6D show exemplary signal transmissions for transmitting a low power wake up signal, in accordance with an exemplary embodiment of the invention.

FIG. 6A shows exemplary signal transmissions 600a for transmitting a low power wake up signal, in accordance with an exemplary embodiment of the invention. First a PHY preamble 602a is transmitted. The PHY preamble 602a may be a modified 802.11 PHY preamble as described above. STAs that receive and are able to decode the PHY preamble 602 may be able to obtain information that indicates a period of time to defer access to the wireless communication medium. As shown in FIG. 6A, the time to defer may correspond to the time needed by the transmitting STA 106 or AP 104 to transmit the low power wake-up signals to one or more receivers. In one aspect a low power receiver 228 may not be able to decode or detect the preamble 602. After sending the PHY preamble 602a, a low power wake-up signal 604a is transmitted. A low power receiver STA 106e may be able to detect the low power wake-up signal 604a and activate a transceiver 214 for receiving, for example, OFDM communications. In addition, a second low power wake-up signal 605a intended for another low power receiver STA 106e may be transmitted.

Figure 6B:
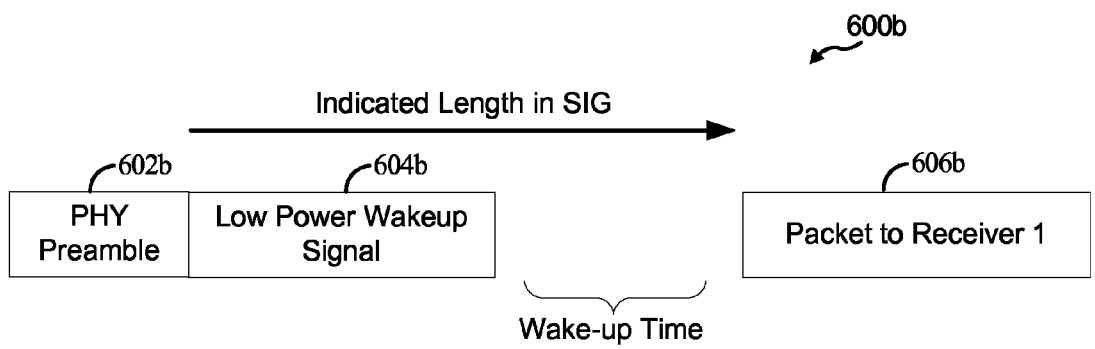

FIG. 6B shows another group of exemplary signal transmissions 600b for transmitting a low power wake up signal, in accordance with an exemplary embodiment of the invention. First a PHY preamble 602b is transmitted as described above with reference to 6A. As shown in FIG. 6B, the time to defer may correspond to the time needed by the transmitting STA 106 or AP 104 to transmit the low power wake-up signals to one or more receivers and for a determined period needed for the low power receiver STA 106e to activate its transceiver 214. After sending the PHY preamble 602b, a low power wake-up signal 604b is transmitted. A low power receiver STA 106e may be able to detect the low power wake-up signal 604b and activate a transceiver 214. After a wake-up time period after which the low power receiver STA 106e is ready to receive wireless communications, the STA 106 that transmitted the low power wake-up signal 604c may send a packet 606b to the low power receiver STA 106e.

Figure 6C:
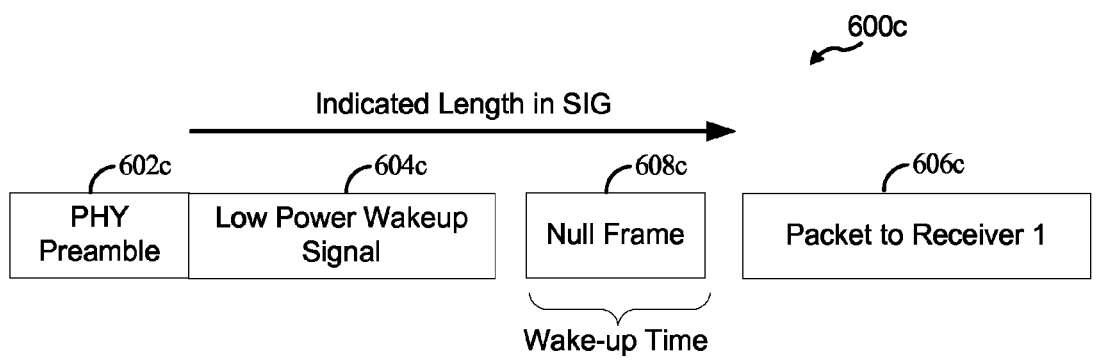

FIG. 6C shows another group of exemplary signal transmissions 600c for transmitting a low power wake-up signal, in accordance with an exemplary embodiment of the invention. First a PHY preamble 602c is transmitted as described above with reference to 6A. As shown in FIG. 6C, the time to defer may correspond to the time needed by the transmitting STA 106 or AP 104 to transmit the low power wake-up signals to one or more receivers and for a determined wake-up period needed for the low power receiver STA 106e to activate its transceiver 214. After sending the PHY preamble 602c, a low power wake-up signal 604c is transmitted. A low power receiver STA 106e may be able to detect the low power wake-up signal 604c and activate a transceiver 214. During the wake-up time period, a null frame 608c may be transmitted such that the presence of a signal may be detected on the wireless communications medium. For example, a STA 106 that misses the preamble 602c or that is unable to decode the preamble 602c correctly due to, e.g., a low SNR, may still be able to detect energy on the wireless medium during the null frame 608c and refrain from accessing the medium for the time period. After a wake-up time period after which the low power receiver STA 106e is ready to receive wireless communications, the STA 106 that transmitted the low power wake-up signal 604c may send a packet 606b to the low power receiver STA 106e. This packet may be received and decoded by the transceiver 214 of the low power receiver STA 106e.

Figure 6D:
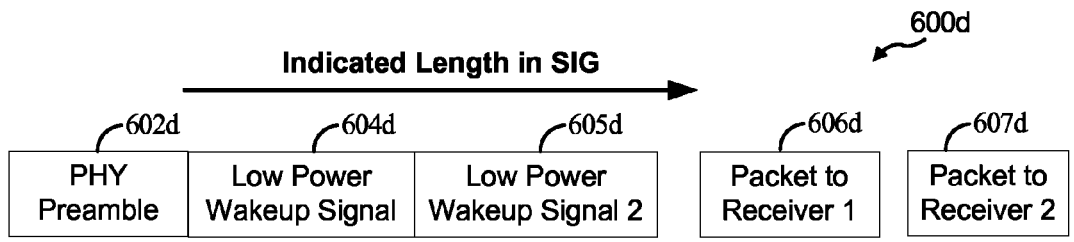

FIG. 6D shows another group of exemplary signal transmissions 600d for transmitting a low power wake-up signal, in accordance with an exemplary embodiment of the invention. After transmitting the PHY preamble 602d, two low power wake-up signals may be transmitted 604d and 605d to two different low power receiver STAs. Other STAs that are able to decode the preamble 602d may obtain information from the preamble 602d to defer access to the medium during both low power wake-up signal transmissions.

In another embodiment, an AP or STA 106 that is transmitting a low power wake-up signal may send a CTS-to-self or other frame that sets the network allocation vector (NAV) before the wake-up signal.

Figure 7A:
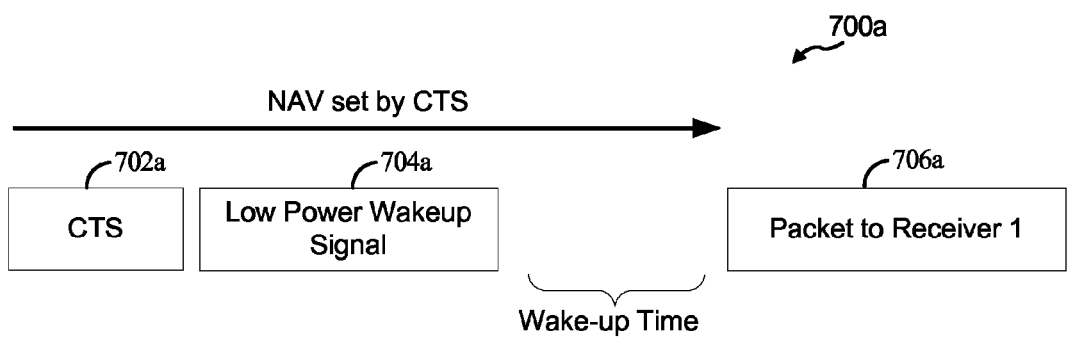
FIGS. 7A and 7B show additional exemplary signal transmissions for transmitting a low power wake up signal, in accordance with an exemplary embodiment of the invention.

FIG. 7A shows another group of exemplary signal transmissions for transmitting a low power wake up signal, in accordance with an exemplary embodiment of the invention. A backoff signal may be transmitted over the wireless medium. For example, the backoff signal may include a CTS frame 702a that is sent over the wireless medium by an AP or a STA. Any STA 106 that is able to receive and decode the CTS frame 702a may set its NAV and defer access to the channel for the duration of the low power wake-up signal and optionally a wake-up time period as well. For example, one or more STAs may receive the CTS frame 702a and, in response, may defer access to the channel by refraining from transmitting a wireless signal during the time period indicated by the CTS frame 702a. The time period that the one or more STAs may defer access to the channel may include the duration of the low power wake-up signal so that no collisions or interference occurs between a transmitted signal and the low power wake-up signal. The CTS frame 702a may also indicate that the one or more STAs defer access for the duration of a wake-up time period so that various components (e.g., transceiver, receiver, transmitter, etc.) of the STA receiving the wake-up signal have time to power-up or wake-up prior to receiving the signals transmitted by the one or more STAs. For example, as described above, the wake-up time for the STA may be a function of a phase-locked loop (PLL) convergence time, loading of calibration coefficients, and other register loading.

After the CTS frame 702a is sent, a low power wake-up signal 704a is transmitted. A corresponding low power receiver STA 106e may receive and detect the low power wake-up signal and thereafter activate its transceiver 214. The AP or STA 106 transmitting the low power wake-up signal 704a thereafter transmits a packet to the low power receiver STA 106e. In addition, the AP or STA 106 transmitting the low power wake-up signal 704a may transmit a null frame during the wake-up time as described above.

Figure 7B:
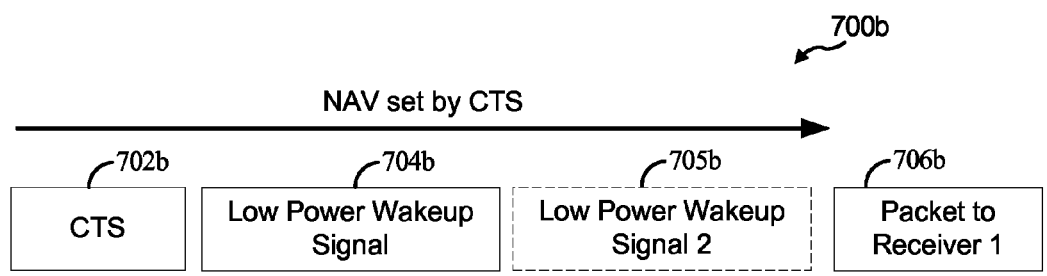

FIG. 7B shows another group of exemplary signal transmissions for transmitting a low power wake up signal, in accordance with an exemplary embodiment of the invention. The frames are the same as FIG. 7A, except that two low power wake-up signals 704b and 705b are transmitted. In this case the CTS 702b may indicate to set the NAV for a duration of both low power wake-up signals 704b and 705b. Thereafter, packets (e.g., packet 706b) are sent to the corresponding receiver.

The encoded bits included in a low power wake-up signal 500a may convey a variety of different types of information. For the case of a low power receiver STA 106e associated with AP 104 or another STA 106, the bits may represent the association ID (AID) of the STA 106e to be woken up. If multiple STAs need to be woken up, multiple AIDs may be transmitted. The encoded information may represent an identifier of a group of STAs. Only the STAs of the group actually wake up and read the regular paging message. The encoded information may further represent a bitmap to where each bit indicates a STA 106e. For example, for the corresponding STA 106e, a bit=1 indicates that the STA 106e is to wake up while a bit=0 indicates that the STA 106e can keep sleeping. The encoded information may further represent an identifier of the BSS. This may be useful for overlapping BSSs. In this case STAs of the BSS identified wake up.

For non-associated STAs, the encoded information may include a global ID to indicate the address of the STA 106e to be woken up, in the ideal case. The identifier may further be an identifier of a predetermined type of STAs. For example an identifier in the encoded information may correspond to classes of IDs. These classes may be based on services (e.g., sensors that include temperature information, vendor type, and the like). As such, the type may relate to some characteristics of the STA 106e, such as transmission power capabilities or vendor.

Figure 8:
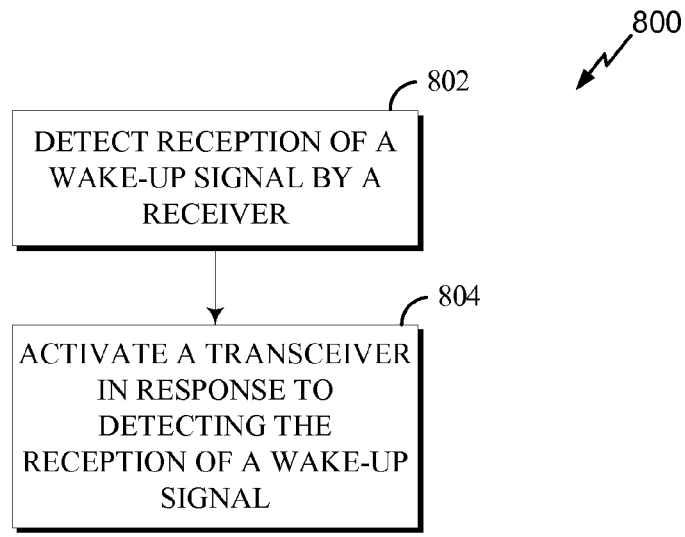
FIG. 8 is a flowchart of an exemplary method of wireless communication, in accordance with an exemplary embodiment of the invention.

FIG. 8 is a flowchart of an exemplary method 800 of wireless communication for activating a low power receiver. The method may be performed by a low power receiver STA 106e. At block 802, reception of a wake-up signal is detected by a receiver. For example, the low power receiver STA 106e may include a wake-up circuit 230 with a low power receiver 228 that may be configured to receive and detect the wake-up signal. At block 804, a transceiver 214 is activated in response to detecting the reception of the wake-up signal. For example, the wake-up circuit 230 may turn on or power on a transceiver 214 in response to detecting the wake-up signal. In one aspect, the low power receiver STA 106e is configured to transmit and receive communications via the transceiver 212 according to a standard such as 802.11.

Figure 9:
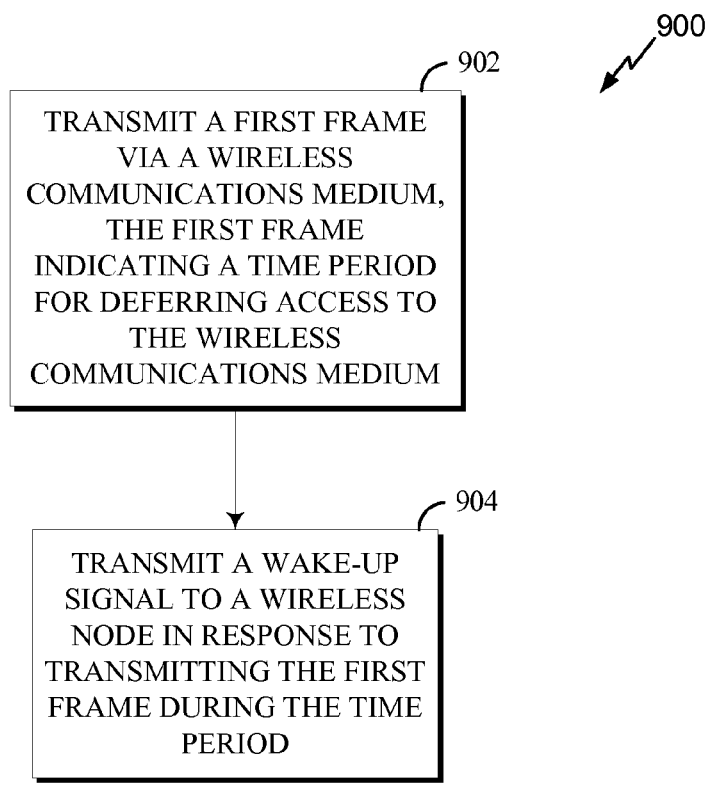
FIG. 9 is a flowchart of another exemplary method of wireless communication, in accordance with an exemplary embodiment of the invention.

FIG. 9 is a flowchart of another exemplary method 900 of wireless communication for activating a low power receiver. The method may be performed by a STA 106 or an AP 104. At block 902, a first frame is transmitted via a wireless communications medium. The first frame indicates a time period for deferring access to the wireless communications medium. For example, other STAs with active transceivers may be able to receive and decode the first frame and defer access to the medium while a wake-up signal is transmitted to a low power receiver STA 106e. In some embodiments, the first frame is an 802.11 OFDM PHY preamble. A low power receiver STA 106e may not be capable of decoding the first frame. In one aspect a STA 106 or AP 104 transmits the first frame. In another embodiment, the first frame is a CTS frame or other frame that allows for setting the network allocation vector (NAV) to defer access to the medium. At block 904, a wake-up signal is transmitted to a wireless node in response to transmitting the first frame during the time period. The wireless node may be a low power receiver STA 106e. For example, the STA 106 or AP 104 that transmitted first frame may thereafter transmit the wake-up signal.

Figure 10:
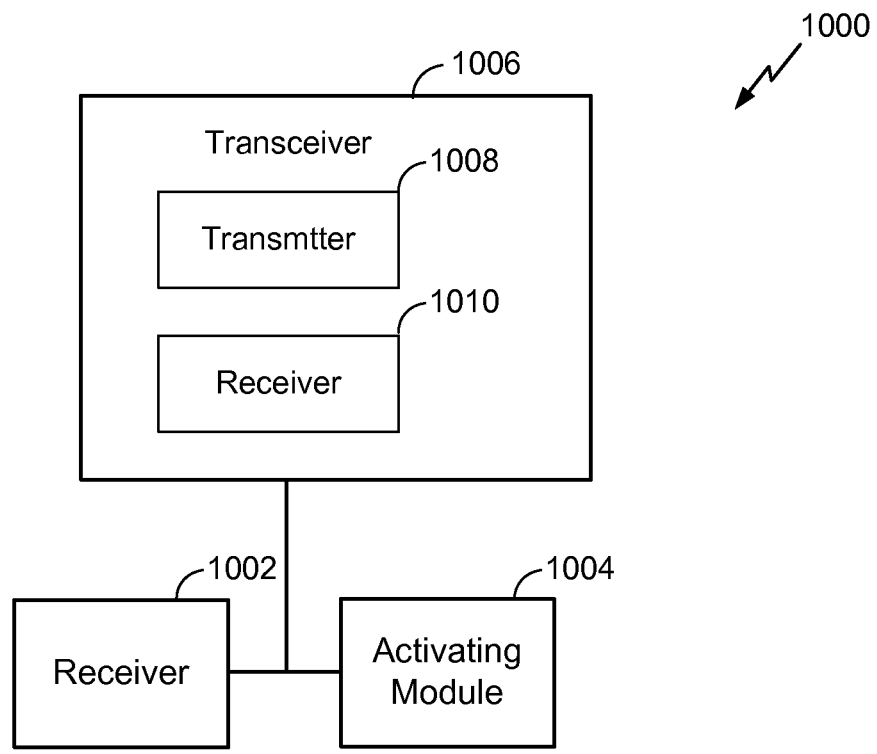
FIG. 10 is a functional block diagram of another exemplary wireless device that may be employed within the wireless communication system of FIG. 1.

FIG. 10 is a functional block diagram of another exemplary wireless device 1000 that may be employed within the wireless communication system 100. A wireless communication device 1000 may have more components than the wireless communication devices shown in FIGS. 2-4. The wireless communication device 1000 shown includes only those components useful for describing some prominent features of certain implementations. The device 1000 includes a receiver or a second receiver 1002 that may be able to receive a wake-up signal. In some cases, a means for receiving may include the receiver 1002. The receiver 1002 may be configured to perform one or more of the functions described above with respect to block 802 of FIG. 8. The receiver 1002 may correspond to the low power receiver 220 of FIG. 2. The device 1000 further comprises an activating module or a processing module 1004 that is configured to activate a first transceiver or a transceiver 1006. The activating module 1004 may correspond to the wake-up circuit 230 of FIG. 2. The transceiver 1006 may correspond to the transceiver 214 of FIG. 2. In some implementations, the transceiver 1006 comprises at least one receiver 1010 (e.g., the receiver 212 or the low power receiver 228 of FIG. 2) and a transceiver 1006 (e.g., the transmitter 210 of FIG. 2). The receiver 1002 (e.g., the receiver 212 or 228) and the transceiver 1006 (e.g., the transceiver 214) may be further configured to sleep or wake up in a synchronous mode or an asynchronous mode. For example, in a half duplex implementation of an asynchronous mode, while the receiver unit 1002 wakes up, the transceiver unit 1006 may go to sleep. When the receiver unit 1002 is in a sleep mode or a power saving mode, the transceiver unit 1006 may be in an active mode. During an active mode, the transceiver unit 1006 may be configured to actively monitor and receive wireless signals. In some cases, a means for activating may include the processor module 1004. The activating module 1004 is operationally coupled to both the receiver unit 1002 and the transceiver unit 1006.

In some implementations, the receiver unit 1002 is configured to consume less power than the transceiver unit 1006. More particularly, when the wireless device 1000 determines that there is no wireless signal for the transceiver unit 1006 to receive and/or transmit during a certain time period, the transceiver unit 1006 may be configured to stay in a sleep mode or transit to a sleep mode or a power saving mode for saving power. During this period, the receiver unit 1002 may continue to or be woken up to monitor any incoming signal, for example, a wake-up signal. As such, during the time period when the transceiver 1006 is in a sleep mode or a power saving mode, the receiver unit 1002 may be in an active mode for detecting a possible wake-up signal.

In one implementation, the receiver unit 1002 is configured to monitor and detect a wake-up signal sent by another station or another transmitter. The wake-up signal may be a broadcast wake-up signal that is intended to be received by every receiver located in a coverage area of the transmitter station, a multicast wake-up signal that is sent to a group of receivers located in the coverage area, or a unicast signal that is sent to a specific receiver. In another implementation, the wake-up signal comprises two or more payloads. Each of the payloads is intended to be received by a specific receiver or a specific group of receivers.

Figure 11:
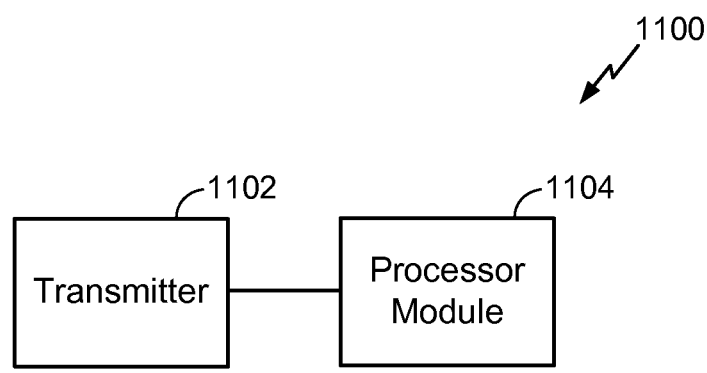
FIG. 11 is a functional block diagram of another exemplary wireless device that may be employed within the wireless communication system of FIG. 1.

FIG. 11 is a functional block diagram of another exemplary wireless device 1200 that may be employed within the wireless communication system 100. A wireless communication device 1200 may have more components than the wireless communication devices shown in FIGS. 2-4. The wireless communication device 1100 shown includes only those components useful for describing some prominent features of certain implementations. The device 1100 includes a transceiver unit 1102. In some cases a means for transmitting may include the transceiver unit 1102. The transceiver unit 1102 may be configured to perform one or more of the functions described above with respect to block 902 of FIG. 9 and block 904 of FIG. 9. The transceiver unit 1102 may correspond to transmitting 210. The device 1100 further comprises a processing module 1104. The processing module 1104 may correspond to the processor 204. In some cases, a means for processing may include the processing module 1104.

Figure 12:
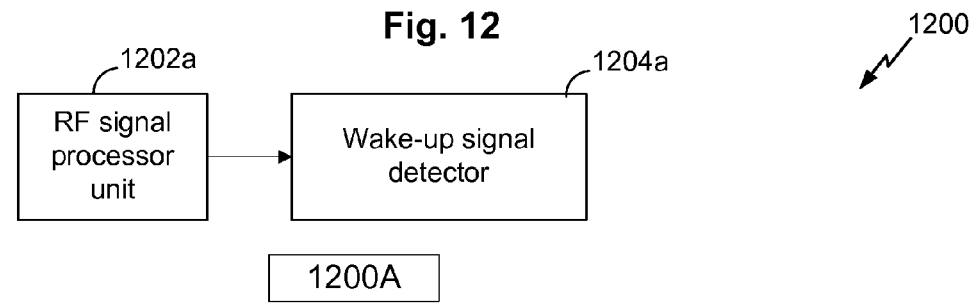
FIG. 12 is a functional block diagram of another exemplary wireless device that may be employed within the wireless communication system of FIG. 1.
Figure 12:
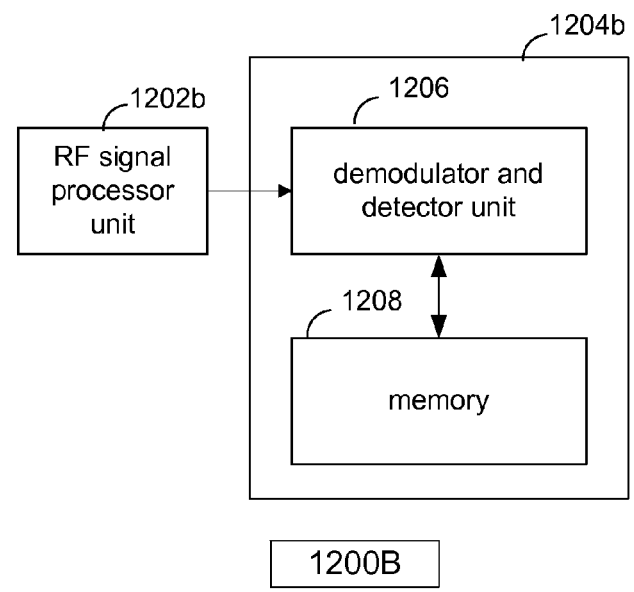
Figure 12:
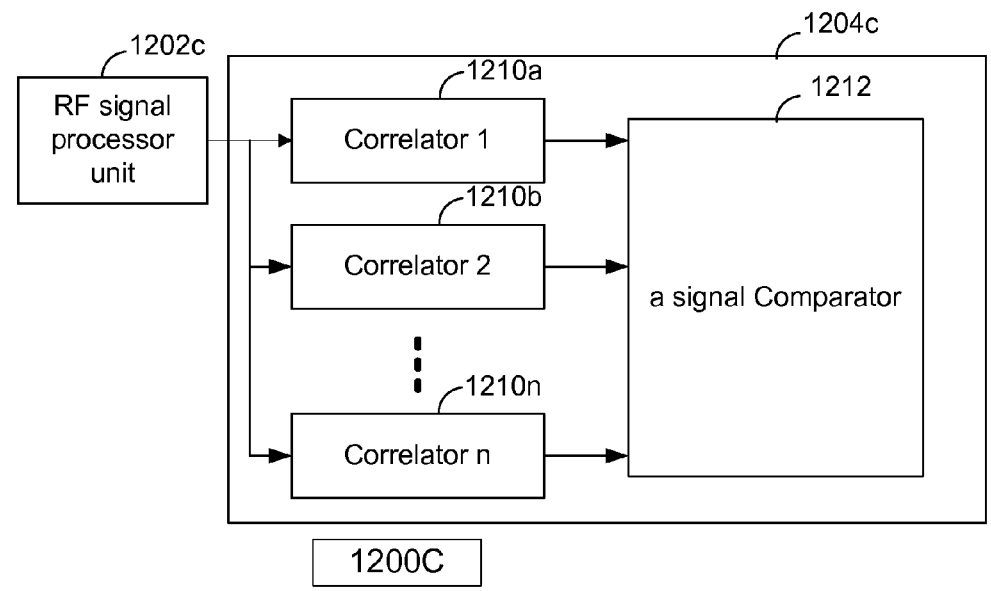

FIG. 12 is a diagram showing certain exemplary implementations 1200A, 1200B and 1200C of the wireless device 202 of FIG. 2 in accordance with some embodiments. Wireless communication devices 1200A-1200C may have more components than the wireless communication devices shown in FIGS. 2-4. A low power wake-up detector 1204a, 1204b or 1204c may be a part of the low power receiver 228 of FIG. 2, the receiver unit 1002 of FIG. 10 or even the first transceiver or the transceiver unit 1006 of FIG. 10. The low power wake-up detector may also be a part of the processing module 1104 of FIG. 11. The low power wake-up detector helps efficiently detect a wake-up signal transmitted by an AP 104 of FIG. 1 at a power level that is less than a regular receiver (e.g., the receiver 212 of FIG. 228).

As shown in FIG. 12, in some embodiments with the implementation 1200A, a wake-up signal detector 1204a is operationally coupled to a RF signal processor unit 1202a. The RF signal processor unit 1202a may comprise a receiver antenna (e.g., the antenna 216 of FIG. 2). The RF signal processor unit 1202a may further comprise an analog to digital converter (e.g., the analog to digital converter 410 of FIG. 4) that help convert a RF signal into a baseband digital signal. In addition, the RF signal processor unit 1202a may comprise one or more analog filters and/or one or more digital filters that process a received RF signal. The RF signal processor unit 1202a outputs processed received signals to the wake-up signal detector 1204a. The wake-up signal detector 1204a is configured to make a decision on the received signals and output a result if the received signals comprise a wake-up signal and if the possible wake-up signal is targeted to wake up a local transceiver module, such as the transceiver unit 1006 of FIG. 10 or the transceiver module 1102 of FIG. 11.

As shown in FIG. 12, in some embodiments with the implementation 1200B, a wake-up signal detector 1204b comprises a demodulator and detector unit 1206 and a memory 1208 (e.g, the memory 206 of FIG. 2). The wake-up signal detector 1204b is operationally coupled to a RF signal processor unit 1202b and receives signals processed by the RF signal processor unit 1202b. The demodulator and detector unit 1206 may comprise a demodulator (e.g., the demodulator 406 of FIG. 4), a baseband signal processor unit (e.g., the channel estimator and channel equalizer 405 of FIG. 5) and/or a transform module (e.g., the FFT module 404 of FIG. 4). The demodulator and detector unit 1206 is configured to demodulate possible signal identification bits from the received signals. After the demodulator and detector unit 1206 successfully decodes the received signals and generates wake-up signal identification bits, the demodulator and detector unit 1206 may further retrieve local identification information stored in the memory 1208. When the detected wake-up signal identification bits match the local identification information, an activation module (e.g., the activating module 1004 of FIG. 10) may wake up a transceiver unit (e.g., the transceiver unit 1006 of FIG. 10). The local identification information for identifying a wake-up signal may be either included in the receiving module 1002 of FIG. 10 or stored in a local memory operationally coupled to the activating module 1004.

In one implementation, a wake-up signal comprises a frequency shift key (FSK) modulated preamble sequence. The FSK modulated preamble sequence may provide information of timing and detection for a receiver, such as the wake-up signal detector 1204b. The FSK modulated preamble sequence may be received by the RF signal processor unit 1202b and converted into a baseband FSK modulated preamble sequence. The baseband FSK modulated preamble sequence may be demodulated and/or detected by the demodulator and detector unit 1206. In another implementation, the demodulator and detector unit 1206 despread and decode information that is spread and encoded in a preamble of the wake-up signal. In some implementations, some parameters of spreading and encoding are agreed between a transmitter and a receiver, such as any of the wireless devices 1200A-1200C. In some other implementation, some parameters of spreading and encoding are negotiated during an association procedure between a transmitter and a receiver.

As shown in FIG. 12, in some embodiments with the implementation 1200C, a wake-up signal detector 1204c comprises a least one match filter or correlator, such as correlators 1210a, 1210b and 1210n, and a signal comparator 1212. The wake-up signal detector 1204c is operationally coupled to a RF signal processor unit 1202c and receives signals processed by the RF signal processor unit 1202c. Each of the correlators 1210a, 1210b and 1210n is configured to correspond to a possible wake-up signal and may further comprise identification information of the possible wake-up signal. Each of the correlators 1210a, 1210b and 1210n receives the signals processed by the RF signal processor unit 1202c and generates a filtered or correlated wake-up signal and a detected signal value. All the detected signal values generated by the correlators 1210a, 1210b and 1210n are inputted to the signal comparator 1212. The signal comparator 1212 is configured to make a decision on if there is a possible wake-up signal received by the RF signal processor unit 1202c and if the possible wake-up signal is targeted to wake up a local transceiver, such as the transceiver unit 1006 of FIG. 10 or the transceiver module 1102 of FIG. 11.

Figure 13:
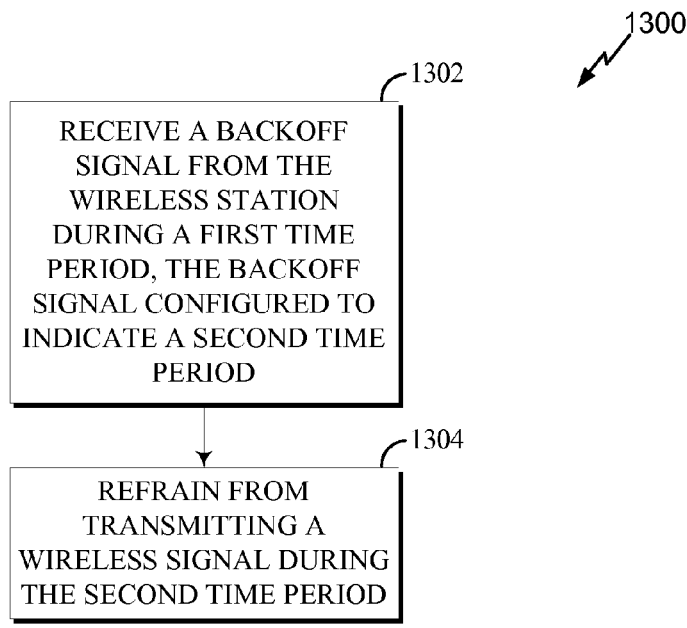
FIG. 13 is a flowchart of an exemplary method of wireless communication, in accordance with an exemplary embodiment of the invention.

FIG. 13 is a flowchart of an exemplary method 1300 of wirelessly communicating with a wireless station. The method may be performed by a STA 106. At block 1302, a backoff signal is received from the wireless station during a first time period, the backoff signal configured to indicate a second time period. The wireless station may include a STA 106 or an AP 104. For example, an STA with an active transceiver may receive the backoff signal and, in response, may defer access to the medium for a period of time while a wake-up signal is transmitted to a low power receiver STA 106e. The STA may further defer access for a period of time while the low power receiver STA 106e wakes up. In some embodiments, the backoff signal is a CTS frame or other frame that allows for setting the network allocation vector (NAV) to defer access to the medium. At block 1304, the method continues by refraining from transmitting a wireless signal during the second time period.

In some aspects, the method 1300 further comprises receiving, at a first receiver, wireless data packets, the first receiver configured to consume power at a first power level during operation. The method 1300 may further comprise detecting, at a second receiver, a wake-up signal transmitted by a transmitter station, the second receiver configured to consume power at a second power level during operation that is less than the first power level. For example, the second receiver may include a low power receiver, such as low power receiver 228. The method 1300 may further comprise waking the first receiver when the second receiver successfully detects the wake-up signal.

Figure 14:
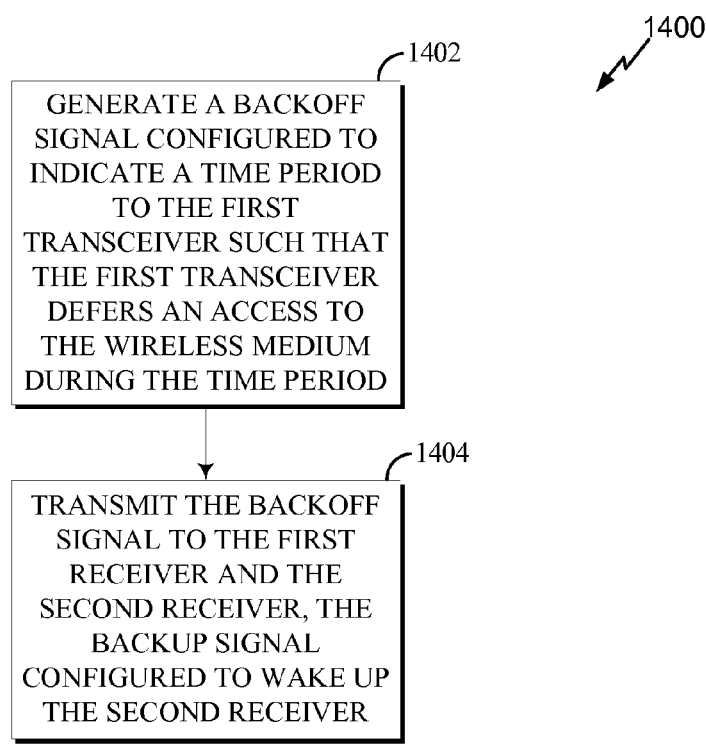
FIG. 14 is a flowchart of another exemplary method of wireless communication, in accordance with an exemplary embodiment of the invention.

FIG. 14 is a flowchart of an exemplary method 1400 of wirelessly communicating with a wireless first transceiver and a second wireless receiver via a wireless medium. The method may be performed by a STA 106 or an AP 104. At block 1402, a backoff signal is generated that is configured to indicate a time period to the first transceiver such that the first transceiver defers an access to the wireless medium during the time period. For example, other STAs with active transceivers may receive the backoff signal and, in response, may defer access to the medium for a period of time while a wake-up signal is transmitted to a low power receiver STA 106e. The other STAs may further defer access for a period of time while the low power receiver STA 106e wakes up. In some embodiments, the backoff signal is a CTS frame or other frame that allows for setting the network allocation vector (NAV) to defer access to the medium. At block 1404, the backoff signal is transmitted to the first transceiver and the second receiver, the backup signal configured to wake up the second receiver As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wirelessly communicating with a wireless station, the apparatus comprising:
   a first transceiver comprising a first receiver, and configured to receive a backoff signal from the wireless station during a first time period, the backoff signal configured to indicate a second time period;
   a processor operationally coupled to the first transceiver and configured to refrain the first transceiver from transmitting a wireless signal during the second time period,
   the first receiver further configured to wirelessly receive data packets at a first transmission bandwidth and consume power at a first power level during operation; and
   a second receiver operationally coupled to the first receiver and configured to detect a wake-up signal received from the wireless station, the second receiver configured to consume power during operation at a second power level that is less than the first power level, and
   wherein the processor is operationally coupled to the first receiver and the second receiver and configured to wake up the first receiver when the second receiver successfully detects the wake-up signal, and to determine a recurring time period based on an association with the wireless station,
   wherein a second transmission bandwidth of the wake-up signal is less than the first transmission bandwidth, and wherein the second receiver is configured to detect the wake-up signal via a wireless channel, a bandwidth of the wireless channel being less than the first transmission bandwidth, and
   wherein the second receiver is further configured to detect the wake-up signal based on the recurring time period.

2. The apparatus of claim 1, wherein the backoff signal further comprises a preamble comprising information of a transmission duration of the backoff signal, and wherein the processor is further configured to refrain the first transceiver from transmitting the wireless signal during the transmission duration.

3. The apparatus of claim 2, wherein the transmission duration comprises an IEEE 802.11 PPDU transmission duration.

4. The apparatus of claim 1, wherein the backoff signal further comprises a checksum, and wherein the processor is further configured to detect a successful decoding of the backoff signal based on the checksum.

5. The apparatus of claim 1, wherein a transmission bandwidth of the backoff signal is less than a transmission bandwidth of an IEEE 802.11 preamble.

6. The apparatus of claim 1, wherein the wireless station is further configured to transmit another signal to a second receiver during the second time period, and wherein the absence of the wireless signal sent by the first transceiver reduces interference to the another signal received by the second receiver during the second time period.

7. The apparatus of claim 6, wherein the backoff signal further comprises a payload including data, and wherein the second receiver is further configured to decode the data.

8. The apparatus of claim 6, wherein the backoff signal further comprises a payload including at least one single-phase signal, and wherein the second receiver further comprises a plurality of correlators to detect the at least one signal-phase signal.

9. The apparatus of claim 6, wherein the backoff signal further comprises at least one first wake-up signal and a second wake-up signal, the at least one first wake-up signal configured to wake up the second receiver, and the second wake-up signal configured to wake up a third receiver.

10. The apparatus of claim 6, wherein the first transceiver is further configured to receive a clear to send signal transmitted by the wireless station, the clear to send signal indicating a third time period including at least one of the first time period or the second time period, and wherein the processor is further configured to refrain the first transceiver from transmitting the wireless signal during the third time period.

11. The apparatus of claim 1, wherein the first transceiver is configured to receive a null frame transmitted by the wireless station, and wherein the processor is further configured to perform a clear channel assessment based at least partially on the null frame.

12. The apparatus of claim 1, wherein the first receiver is further configured to sleep after the first receiver receives the data packets.

13. The apparatus of claim 1, wherein the recurring time period comprises a recurring time period defined by a standard.

14. The apparatus of claim 1, wherein the recurring time period comprises a recurring time period negotiated between the processor and the transmitter station.

15. The apparatus of claim 1, wherein the wake-up signal further comprises a preamble including information of a transmission duration of the wake-up signal, and wherein the second receiver detects at least one portion of the wake-up signal during at least one portion of the transmission duration.

16. The apparatus of claim 15, wherein the preamble is an IEEE 802.11 preamble.

17. The apparatus of claim 1, wherein the second transmission bandwidth is less than an IEEE 802.11 transmission bandwidth, and wherein the bandwidth of the wireless channel is less than the IEEE 802.11 transmission bandwidth.

18. The apparatus of claim 17, wherein the second transmission bandwidth is less than an IEEE 802.11 preamble transmission bandwidth, and wherein the bandwidth of the wireless channel is less than the IEEE 802.11 preamble transmission bandwidth.

19. The apparatus of claim 1, wherein the wake-up signal comprises an IEEE 802.11 PPDU, and wherein the processor is further configured to demodulate the IEEE 802.11 PPDU.

20. The apparatus of claim 1, wherein the wake-up signal further comprises a checksum, and wherein the processor is further configured to detect a successful decoding of the wake-up signal based on the checksum.

21. The apparatus of claim 1, wherein the wake-up signal further comprises a payload, and wherein the processor is further configured to decode the payload.

22. The apparatus of claim 1, wherein the wake-up signal further comprises a payload including at least one single-phase signal, and wherein the second receiver further comprises a plurality of correlators configured to detect the at least one signal-phase signal.

23. The apparatus of claim 1, wherein another wake-up signal is transmitted by the transmitter station to wake up a third receiver.

24. The apparatus of claim 23, wherein the wake-up signal and the another wake-up signal share a preamble comprising information of at least one of a transmission duration of the wake-up signal or another transmission duration of the another wake-up signal.

25. The apparatus of claim 1, wherein a null frame is transmitted by the transmitter station after the transmitter station transmits the wake-up signal, and wherein the processor is further configured to perform a clear channel assessment based at least partially on the null frame.

26. The apparatus of claim 1, wherein the second receiver is further configured to receive a clear to send signal transmitted by the transmitter station, and wherein the clear to send signal comprises information of a transmission time period of the wake-up signal.

27. The apparatus of claim 26, wherein the clear to send signal comprises information of at least one of an address of the transmitter station, an address of the second receiver or another predefined address.

28. The apparatus of claim 1, wherein the second receiver is configured to detect the wake-up signal using at least one of on-off keying or frequency-shift keying.

29. An apparatus for wirelessly communicating with a wireless first transceiver, a second transceiver and a second wireless receiver via a wireless medium, the apparatus comprising:
  a processor configured to:
    determine a back-off time period based, at least in part, on a phase-locked loop (PLL) converge time and calibration coefficients of the second wireless receiver and a duration of a low power wake up signal;
    generate a clear to send (CTS) frame configured to indicate the first transceiver defers an access to the wireless medium during the back-off time period; and
  a transmitter operationally coupled to the processor and configured to:
    transmit data packets to the first transceiver at a first transmission bandwidth;
    transmit clear to send (CTS) frame to the first transceiver, and
    transmit the low power wakeup signal to the second receiver on a wireless channel with a second transmission bandwidth less than the first transmission bandwidth, the wakeup signal configured to wake up the first second transceiver.

30. The apparatus of claim 29, wherein the backoff signal further comprises a preamble comprising information of a transmission duration of the backoff signal, and wherein the first transceiver is further configured to defer the access to the wireless medium during the transmission duration of the backoff signal.

31. The apparatus of claim 29, wherein the backoff signal further comprises a checksum, and wherein at least one of the first transceiver or the second receiver is configured to detect a successful decoding of the backoff signal based on the checksum.

32. The apparatus of claim 29, wherein the backoff signal further comprises a payload comprising data, and wherein at least one of the first transceiver or the second receiver is further configured to decode the data.

33. The apparatus of claim 29, wherein a transmission duration of the backoff signal comprises an IEEE 802.11 PPDU transmission duration.

34. The apparatus of claim 29, wherein the second transmission bandwidth of the wakeup signal is less than a transmission bandwidth of an IEEE 802.11 preamble.

35. The apparatus of claim 29, wherein the backoff signal further comprises a payload comprising at least one single-phase signal, and wherein at least one of the first transceiver or the second receiver further comprises a plurality of correlators to detect the at least one signal-phase signal.

36. The apparatus of claim 29, wherein the transmitter is further configured to transmit another backoff signal, the another backoff signal configured to wake up a third receiver.

37. The apparatus of claim 36, wherein the backoff signal and the another backoff signal share a preamble comprising information of at least one of a transmission duration of the backoff signal or another transmission duration of the another backoff signal.

38. The apparatus of claim 29, wherein the transmitter is further configured to transmit a null frame, and wherein at least one of the first transceiver or the second receiver is further configured to perform a clear channel assessment based at least partially on the null frame.

39. The apparatus of claim 29, wherein the transmitter is further configured to transmit the backoff signal using at least one of on-off keying or frequency-shift keying.

40. A method of wirelessly communicating with a wireless station, the method comprising:

receiving, at a first receiver, data packets at a first transmission bandwidth, the first receiver configured to consume power at a first power level during operation;

receiving, at the first receiver, a backoff signal from the wireless station during a first time period, the backoff signal configured to indicate a second time period;

refraining, at a processor operationally coupled to the first receiver, from transmitting a wireless signal during the second time period;

detecting, at a second receiver operationally coupled to the first receiver, a wake-up signal received from the wireless station, the second receiver configured to consume power during operation at a second power level that is less than the first power level; and waking, via the processor, the first receiver when the second receiver successfully detects the wake-up signal, wherein the processor is operationally coupled to the second receiver;

determining, via the processor, a recurring time period based on an association with the wireless station, wherein a second transmission bandwidth of the wake-up signal is less than the first transmission bandwidth, and wherein the second receiver is configured to detect the wake-up signal via a wireless channel, a bandwidth of the wireless channel being less than the first transmission bandwidth, wherein detecting the wake-up signal comprises detecting the wake-up signal based on the recurring time period.

41. The method of claim 40, wherein the backoff signal further comprises a preamble comprising information of a transmission duration of the backoff signal, and wherein refraining from transmitting the wireless signal comprising refraining from transmitting the wireless signal during the transmission duration.

42. The method of claim 41, wherein the transmission duration comprises an IEEE 802.11 PPDU transmission duration.

43. The method of claim 40, wherein the backoff signal further comprises a checksum, and wherein receiving the backoff signal further comprises detecting a successful decoding of the backoff signal based on the checksum.

44. The method of claim 40, wherein the second transmission bandwidth is less than an 802.11 transmission bandwidth.

45. The method of claim 44, wherein the second transmission bandwidth is less than an IEEE 802.11 preamble transmission bandwidth, and wherein the bandwidth of the wireless channel is less than the IEEE 802.11 preamble transmission bandwidth.

46. The method of claim 40, wherein the method further comprises:
receiving a null frame transmitted by the wireless station; and
performing a clear channel assessment based at least partially on the null frame.

47. The method of claim 40, wherein the method further comprises:
receiving a clear to send signal transmitted by the wireless station, the clear to send signal configured to indicate information of a third time period, the third time period comprising at least one of the first time period or the second time period; and
refraining from transmitting the wireless signal during the third time period.

48. The method of claim 40, wherein the method further comprises deactivating the first receiver after waking the first receiver to receive the data packets or before waking the first receiver to receive the data packets.

49. The method of claim 40, wherein the method further comprises deactivating the second receiver before detecting the wake-up signal or after detecting the wake-up signal.

50. The method of claim 40, wherein detecting the wake-up signal comprises detecting the wake-up signal at a recurring time period.

51. The method of claim 40, wherein detecting the wake-up signal further comprises detecting a transmission time period of the wake-up signal.

52. The method of claim 51, wherein detecting the transmission time period comprises detecting the transmission time period based on an IEEE 802.11 preamble.

53. The method of claim 51, wherein detecting the transmission time period comprises detecting an IEEE 802.11 PPDU transmission duration.

54. The method of claim 53, wherein detecting the wake-up signal comprises detecting a successful decoding of the wake-up signal based on a checksum of the wake-up signal.

55. The method of claim 40, wherein detecting the wake-up signal further comprises decoding a payload of the wake-up signal.

56. The method of claim 40, wherein detecting the wake-up signal further comprises detecting the wake-up signal using a plurality of correlators.

57. The method of claim 40, wherein the method further comprises detecting a clear to send signal sent by the transmitter station, and wherein the clear to send signal comprises information of a transmission time period of the wake-up signal.

58. The method of claim 57, wherein detecting the clear to send signal further comprising detecting information of at least one destination address of the clear to send signal, the at least one destination address comprising information of at least one of an address of the transmitter station, an address of the second receiver or another predefined address.

59. The method of claim 40, wherein detecting the wake-up signal further comprises decoding the wake-up signal using at least one of on-off keying or frequency-shift keying.

60. A method of wirelessly communicating with a wireless first transceiver, a second transceiver and a second wireless receiver via a wireless medium, the method comprising:
transmitting data packets to the first transceiver over a first transmission bandwidth;
determining a back-off time period based, at least in part, on a phase-locked loop (PLL) converge time and calibration coefficients of the second wireless receiver and a duration of a low power wake up signal;
generating a clear to send (CTS) frame configured to indicate a time period to the first transceiver such that the first transceiver defers an access to the wireless medium during the time period;
transmitting the clear to send (CTS) frame to the first transceiver;
transmitting the low power wake-up signal to the second receiver via a wireless channel with a second transmission bandwidth less than the first transmission bandwidth, the wake-up signal configured to wakeup the second transceiver.

61. The method of claim 60, wherein generating the backoff signal further comprises generating the backoff signal comprising a preamble, the preamble configured to indicate a transmission duration of the backoff signal to the first transceiver such that the first transceiver defers the access to the wireless medium during the transmission duration of the backoff signal.

62. The method of claim 60, wherein generating the backoff signal further comprises generating the backoff signal comprising a checksum, and wherein at least one of the first transceiver or the second receiver is configured to detect a successful decoding of the backoff signal based on the checksum.

63. The method of claim 60, wherein generating the backoff signal further comprises generating the backoff signal comprising a data payload, and wherein at least one of the first transceiver or the second receiver is further configured to decode the data payload.

64. The method of claim 60, wherein transmitting the backoff signal comprises transmitting the backoff signal during an IEEE 802.11 PPDU transmission duration.

65. The method of claim 60, wherein the second transmission bandwidth of the wireless channel is configured to be less than an 802.11 transmission bandwidth.

66. The method of claim 60, wherein generating the backoff signal comprises generating the backoff signal comprising at least one single-phase signal.

67. The method of claim 60, wherein the method further comprises:

generating another backoff signal configured to indicate another time period to the first transceiver such that the first transceiver defers an access to the wireless medium during the another time period the transmitter; and transmitting the another backoff signal to wake up a third receiver.

68. The method of claim 60, wherein the backoff signal and the another backoff signal share a preamble, the preamble comprising information of at least one of a transmission duration of the backoff signal or another transmission duration of the another backoff signal.

69. The method of claim 60, wherein the method further comprises transmitting a null frame, and wherein at least one of the first transceiver or the second receiver is further configured to perform a clear channel assessment based at least partially on the null frame.

70. The method of claim 60, wherein transmitting the backoff signal further comprises transmitting the backoff signal using at least one of on-off keying or frequency-shift keying.

* * * * *